Sept. 16, 1958     F. E. McCOMB     2,851,753
BELT FASTENER
Filed April 12, 1956
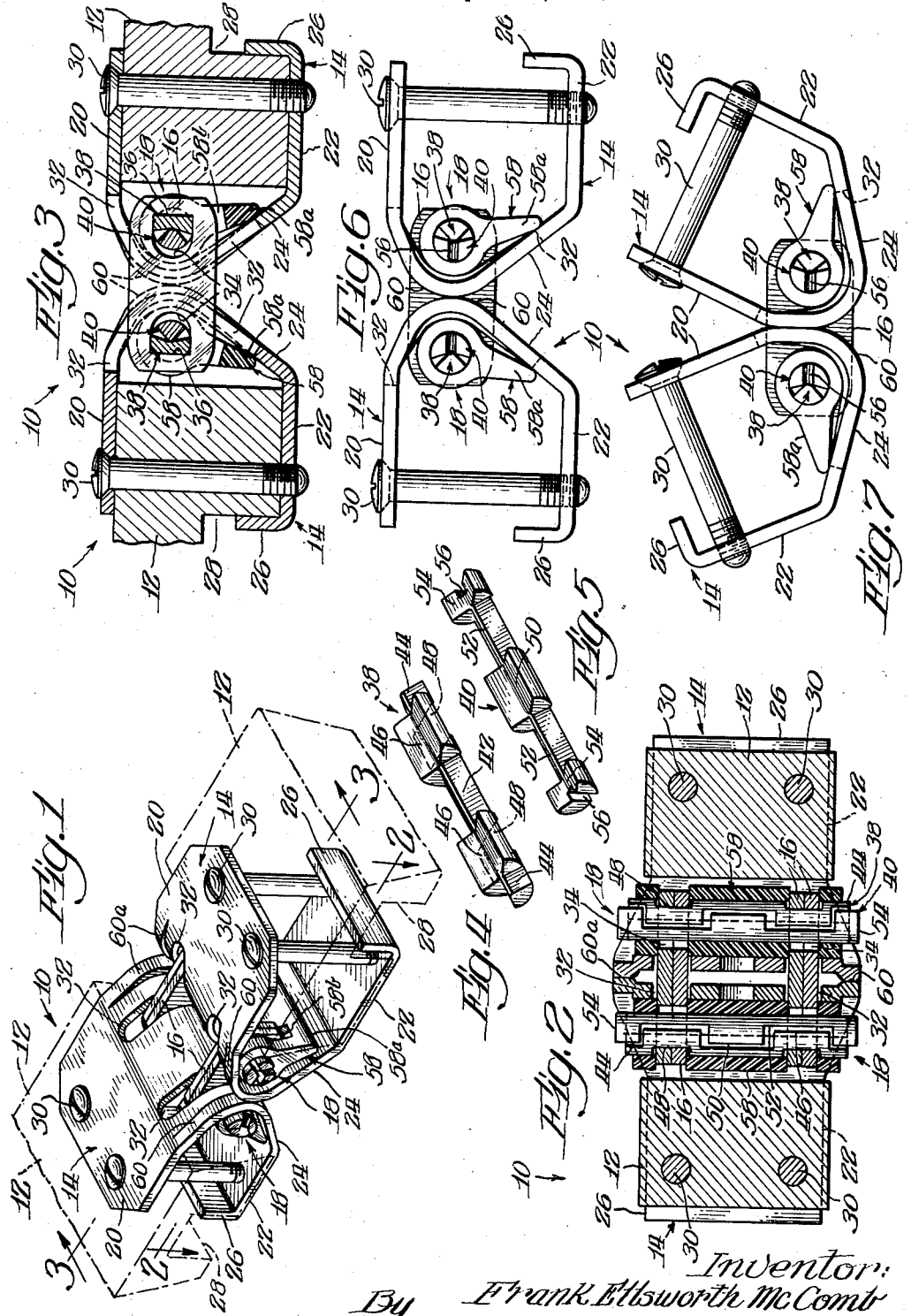
Inventor:
Frank Ellsworth McComb
By Soans, Glaister & Anderson    Attys.

United States Patent Office 2,851,753
Patented Sept. 16, 1958

2,851,753

BELT FASTENER

Frank Ellsworth McComb, Chicago, Ill., assignor to Flexible Steel Lacing Company, Chicago, Ill., a corporation of Illinois Application April 12, 1956, Serial No. 577,703

3 Claims. (Cl. 24—33)

This invention relates to improvements in belt fasteners and more particularly to improved means for maintaining, during shipment and for application, the desired assembly or groups of elements constituting the flexible fasteners for V or side driving belts.

In certain types of flexible V-belt fasteners, for example that shown in U. S. Patent No. 2,189,291 to J. C. Olsen, dated February 6, 1940, the complete fastener comprises numerous elements, most of which are quite small and comparatively difficult to handle. These elements, especially the sectional rocker pins and bushings, must be carefully assembled in a particular manner in order that the fastener may function properly. Very frequently such V-belt fasteners must be applied under adverse circumstances and often by persons who are not familiar with the details of assembly or even with a knowledge of all of the parts constituting such fasteners.

It is the primary object of the invention to provide improved means in flexible or hinged types of V-belt fasteners by which the same may be shipped and, during shipment and in application to the belt, maintained as an assembled unit without danger of loss or misplacement of any of the parts of the fastener.

Other objects of the invention will become apparent from the following disclosure of a selected embodiment of the invention with respect to the accompanying drawings, wherein:

Figure 1 is a perspective view of the belt fastener, with the belt ends indicated by broken lines.

Figure 2 is a sectional view taken along the line 2—2 in Figure 1.

Figure 3 is a sectional view taken along the line 3—3 in Figure 1.

Figures 4 and 5 are detailed perspectives, upon an enlarged scale, of the two-complemental elements of a complete rocker hinge pin of the type shown in Figures 1 and 3.

Figure 6 is a side view of the belt fastener, illustrating the relative position of the elements for shipment and installation purposes.

Figure 7 is another side view of the belt fastener, illustrating the disposition of the elements during assembly.

With reference to the drawings, it is seen that the selected embodiment of the invention comprises a belt fastener 10 which is used to secure the adjacent ends of a belt indicated at 12. The improved belt fastener comprises generally a pair of attaching members 14, links 16 pivotally interconnecting the attaching members, and a pair of rocker hinge pin assemblies 18.

The attaching members 14 are of similar construction and each is preferably of bail-like formation having an outer or top wide arm 20, inner or bottom narrower arm 22, and a connecting bight 24. The arms 20 and 22 overlie the outer and inner faces of the belt, with a projecting flange 26 at the free end of the arm 22 extending upwardly along one face of a groove 28 formed in the belt 12. Each attaching member is suitably secured to the belt by a plurality of pins or screws 30 disposed transversely of the belt and through aligned openings in the top and bottom arms of the attaching member.

The bights 24 of the attaching members are provided with slots or apertures 32 through which are adapted to be extended the ends of the links 16. Of course, each of the attaching members 14 may have one or more such slots depending upon the width of the fastener and the belt. Each of the links preferably consists of two relatively thin plate-like stampings which are apertured adjacent their ends at 34 (Fig. 3) to receive the rocker hinge pins 18. The apertures 34 are somewhat elongated in the direction of the length of the links and at their outer ends are provided with generally flat edges 36 which are cooperable with corresponding notches or flat portions on one of the rocker hinge pin elements, as hereinafter described. In the illustrated embodiment, the attaching members are each provided with a pair of the slots 32 and each slot receives one end of a pair of the links 16.

Each of the rocker hinge pin assemblies 18 consists of two elements 38 and 40, best illustrated in Figures 4 and 5, which cooperate to provide for pivotal movement between the attaching members 14. The element 38 has its central portion of knife edge cross section, as indicated at 42, as well as the two end portions indicated at 44. Inwardly of each of the end portions 44 is a re-entrant V-formation 46 disposed so that the apices of the V-sections 46 form a straight line with the knife edges provided by the sections 42 and 44. The back of each of the V-sections 46, opposite the apex thereof, is provided with a groove 48 forming a flat section along the outer surface of the element and the groove 48 is adapted to engage the flat edge 36 of the link 16 (Fig. 2), to thereby provide a non-rockable engagement between each element 38 and the link or links 16 and to prevent axial shifting of the hinge pin and the link 16.

The other hinge pin element 40 is preferably somewhat longer than the element 38 and includes at its central portion a re-entrant V-section 50 of slightly less length than the section 42 of element 38. On either side of V-section 50 and contiguous thereto are a pair of knife edge sections 52 which are slightly greater in length than the V-sections 46 of element 38. The opposite ends of the element 40 are provided with re-entrant V-sections 54 which are adapted to engage the knife edges 44 on element 38 and which are made somewhat longer than edges 44 in order to provide for a pair of screw slots 56. As in element 38, the knife edges provided on element 40 coincide with the apices of the re-entrant V-sections thereon.

The outer surfaces of both hinge pin elements 38 and 40 are cylindrical with the axis coinciding with the knife edges proper and the radius such that the assembled rocker hinge pins can be received by the apertures 34 in the links 16. A bearing bushing 58, of nylon or other suitable material, is provided for each of the hinge pin assemblies and is generally of a cylindrical outer contour to seat within the rounded bight 24 of the attaching member and includes a flap or flange 58a which extends inwardly of the attaching member to thereby limit the turning movement of the bushing. Slots 58b are in the bushing to accommodate the links 16.

It will be understood that in order to maintain the hinge pin in assembled position in the link apertures 34 and to afford rocking of the hinge pin element 40 relative to element 38, the flat grooved sections 48 must be engaged by the flat sections 36 of the apertures 34. This operative position of the hinge pins prevents relative lateral shifting between the rocker hinge pin and the link connectors, and also provides for rocking of the pin 40 in unison with the link connectors 16 relative to the hinge pin 38.

Normally, the above described operative condition of the complete belt fastener is maintained by means of tension applied by the belt on the fastener, and engagement is thereby maintained between the flats 48 and 36 on the pin 38 and link 16, respectively. However, it is impracticable to ship the complete belt assembly as a single unit and, furthermore, very rarely could a complete fastener be attached, as a complete unit to the belt ends or in a condition simulating the operating tension on the belt.

In order, therefore, to ship the belt fastener in a completely assembled condition, without the belt, so that none of the parts may be lost or displaced, and further to facilitate the attachment to the belt end and lend guidance to the workmen applying the same as to the correct manner of assembling the parts, the following described means are employed. In this connection it will be understood that some of the parts of the fastener, particularly for small size V-belts, are quite small and difficult to manipulate and easily lost if not made for safe shipment. For instance, the total length of the rocker hinge pin for a ⅞" belt is only approximately ½" in actual practice, and the length of the shorter section of the hinge pin is only approximately ⅜", with corresponding diameters for these pins.

In adapting the improved fastener for shipment and readier application, the bight portion 24 of one or both of the attaching members 14 is provided with a raised section 60 on the outer surface of the arcuate bearing section of the bight which engages the cylindrical bushing 58. The raised section 60 is disposed so that when the attaching members 14 are in generally, straight alignment, as in Figure 6, it operates as a rolling cam surface which causes the attaching members 14 to separate and force the hinge pin assemblies rearwardly in the apertures 34 of the link connectors 16, to thereby maintain the flat side of the groove 48 in pin 38 against the flat sections 36 on the link apertures. However, when the attaching members 14 are moved to an angular position, as shown in Figure 7, the raised section 60 no longer provides a force tending to separate the attaching members and the hinge pin assemblies are, therefore, free to move forwardly in the apertures 34 and release the assemblies from their operative position in the link connector apertures.

In the illustrated embodiment the raised bearing section provided for the foregoing purpose comprises a pair of raised, arcuate sections 60 and 60a disposed at opposite ends of each attaching member 14. In this respect, it should be understood that the raised sections are preferably of a size, with regard to the extent of their projection outwardly of the remainder of the bight surface and in the length of the arcuate projection thus afforded, such that they are effective to maintain the hinge pin assemblies in operative position when the attaching members are generally aligned for shipment, and permit an angular range of movement of about 15 to 20 degrees deviation from the aligned position while maintaining said operative position. The arcuate cam surfaces of the raised sections 60 and 60a provide a rolling engagement between the abutting sections to permit such pivotal movement. Furthermore, when the belt fastener is operatively positioned on the adjoining ends of a drive belt, the normal operating tension of the belt may provide sufficient additional tension on the attaching members 14 to further separate these two members and thereby allow free pivotal movement therebetween.

It will be seen, therefore, that the provision of the arcuate shaped bosses or raised sections 60 and 60a eliminates the danger of loss or displacement of any of the parts of the belt fastener during shipment and greatly facilitates and speeds up the application of the fastener to a belt. In the latter respect, it will be apparent that by maintaining a general alignment between the attaching members 14 the belt fastener can be applied to a belt without dis-assembly of the unit other than repositioning the belt fastening screws 30. This is particularly important where the fasteners must be applied under adverse conditions and in cramped quarters. It is also important to note that the unit is shipped in the condition in which it is to operate, and that there are no parts to add to or remove from the unit, as received, in order to secure it in operative position on the belt.

Although shown and described with respect to a particular embodiment, it will be apparent that other modifications might be made without departing from the principles of this invention.

I claim:

1. A belt fastener comprising a pair of attaching members of bail-like formation having an apertured bight, a link connector extending through the apertured bights of said attaching members, means providing a detachable pivotal connection between each of the ends of said link connector located within said bight and said attaching member, said means including a hinge pin having a groove formed in its outer surface and extending through an opening in said link connector and operatively positionable therein for shouldered engagement of the grooved portion of said pin with the adjacent end of said link connector to prevent shifting of the hinge pin transversely of the link connector, and means for retaining said hinge pin in said operative position of engagement with said link connector comprising an arcuate cam section formed on the outer surface of the bight of one of said attaching members in position for rolling engagement with the bight portion of the other of said attaching members.

2. A belt fastener comprising a pair of attaching members of bail-like formation each having upper and lower longitudinally extending arms and an apertured connecting rounded end bight, a link connector extending through the apertured bight of said attaching members, means providing a detachable pivotal connection between each of said attaching members and the end of said link connector located within said bight, said means including a hinge pin having a groove formed in its outer surface and extending through an opening in said link connector and operatively positionable therein for shouldered engagement of the grooved portion of said pin with the adjacent end of said link connector to prevent shifting of the hinge pin transversely of the link connector, the opening in said link connector affording movement of said hinge pin longitudinally of said link connector and relative to said position for shouldered engagement with said link connector, and means for selectively maintaining said hinge pin in said operative position of shouldered engagement with said link connector including a cam surface on the rounded end bight of one of said attaching members in position for rolling engagement with the rounded end bight of the other attaching member, said cam surface providing for pressing engagement of the bights of the attaching members when said members are generally aligned in the direction of the longitudinal axis of said link connector to hold said hinge pins in said position of shouldered engagement with said link connector, and said cam surface affording relative movement between said attaching members to an angularly disposed position releasing the pressing engagement between said bights and thereby permitting said hinge pins to be moved out of said position of shouldered engagement with the link connector.

3. A belt fastener comprising a pair of attaching members of bail-like formation each having upper and lower longitudinally extending arms and an apertured connecting rounded end bight, a link connector extending through the apertured bight of said attaching members, a rocker hinge pin providing a detachable pivotal connection between each of said attaching members and the end of said link connector located within said bight, said hinge pin comprising two elements, each of which is formed with like knife edge and re-entrant V formations formed alternately and continguously lengthwise of the element, the knife edge and re-entrant V formations of one element being staggered with respect to those of the other element to thereby provide a series of complemental but alternately disposed sets of contiguous cooperable, rocking knife edge and re-entrant V formations lengthwise of the rocker hinge pin, said rocker hinge pin extending through an opening in said link connector and one of said hinge pin elements having a groove formed in its outer surface for shouldered engagement with said link connector to prevent shifting of the hinge pin transversely of said connector, the opening in said link connector affording movement of said hinge pin longitudinally of said link connector and relative to said position of shouldered engagement with said link connector, and means for selectively maintaining said hinge pin in said operative position of shouldered engagement with said link connector including a pair of arcuate-shaped cam surfaces disposed at opposite ends of each of the rounded end bight portions of said attaching members, with the cam surfaces on one of said members positioned for rolling engagement with the cam surfaces on the other of said attaching members in a manner such that there is provided a predetermined maximum pressing engagement of the attaching members when they are generally aligned in the direction of the longitudinal axis of said link connector, to thereby create a force on said hinge pins sufficient to maintain said position of shouldered engagement with said link connector, and said cam surfaces being arranged so that as said attaching members are moved to a position of angular relation the force on said hinge pins is released and the latter are free to be moved out of said position of shouldered engagement with the link connector.

References Cited in the file of this patent

UNITED STATES PATENTS 2,189,291     Olsen _____ Feb. 6, 1940

FOREIGN PATENTS 190,575     Great Britain _____ Dec. 28, 1922